United States Patent
Atamas

(10) Patent No.: US 11,144,284 B1
(45) Date of Patent: Oct. 12, 2021

(54) METHOD AND SYSTEM FOR CODE TILE PROGRAMMING

(71) Applicant: Epic Games, Inc., Cary, NC (US)

(72) Inventor: Nicholas Atamas, Bellevue, WA (US)

(73) Assignee: Epic Games, Inc., Cary, NC (US)

( * ) Notice: Subject to any disclaimer, the term of this patent is extended or adjusted under 35 U.S.C. 154(b) by 125 days.

(21) Appl. No.: 16/264,852

(22) Filed: Feb. 1, 2019

(51) Int. Cl.
  *G06F 8/34* (2018.01)
  *G06F 3/0486* (2013.01)

(52) U.S. Cl.
  CPC .............. *G06F 8/34* (2013.01); *G06F 3/0486* (2013.01)

(58) Field of Classification Search
  CPC ................................. G06F 8/34; G06F 3/0486
  See application file for complete search history.

(56) References Cited

U.S. PATENT DOCUMENTS

| | | | | |
|---|---|---|---|---|
| 2012/0272180 | A1* | 10/2012 | Larres | G06F 3/04817 715/784 |
| 2016/0045827 | A1* | 2/2016 | Moya | A63F 13/60 345/582 |
| 2016/0328215 | A1* | 11/2016 | Osterhoff | G06F 8/70 |
| 2017/0010764 | A1* | 1/2017 | Francisco | G06F 8/38 |
| 2017/0083997 | A1* | 3/2017 | Gruber | G06T 11/40 |
| 2019/0050779 | A1* | 2/2019 | Ceccherini | G06F 3/0482 |
| 2021/0096828 | A1* | 4/2021 | Pike | G06F 3/0482 |

OTHER PUBLICATIONS

Sanket Tavarageri et al., "Adaptive parallel tiled code generation and accelerated auto-tuning", [Online], pp. 412-425, [Retrieved from Interent on Jul. 28, 2020], <https://journals.sagepub.com/doi/pdf/10.1177/1094342013493939> (Year: 2013).*

James E. Bake7 et al., "Algori chm Animation Over the World Wide Web", [[Online], pp. 203-213, [Retrieved from Internet on Jun. 4, 2021], <https://dl.acm.org/doi/pdf/10.1145/948449.948480> (Year: 1996).*

F.M. Rijnders et al., "Versatile Visual Programming Environment for Scientific Applications", [Online], pp. 26-31, [Retrieved from Interent on Jun. 4, 2021], <https://dl.acm.org/doi/pdf/10.1145/152428.152432> (Year: 1991).*

(Continued)

*Primary Examiner* — Ziaul A Chowdhury
(74) *Attorney, Agent, or Firm* — Hunton Andrews Kurth LLP

(57) ABSTRACT

According to an embodiment of the disclosure, a computer implemented method and system comprises: presenting, via a display, a plurality of code tile fragments; receiving, via a user interface, a first input that maneuvers a first one of the tile fragments onto a first layer of code tiles, the first one of the tile fragments representing a first portion of an expression or statement; receiving, via the user interface, a second input that maneuvers a second one of the tile fragments onto a second layer of code tiles, the second one of the tile fragments representing a second portion of the expression or statement, wherein the second layer of code tiles is superimposed on the first layer of code tiles; generating, via a processor, the expression or statement based at least in part on the first and second tile fragments; and presenting, via the display, the expression or statement as stacked first and second layers of code tiles.

14 Claims, 6 Drawing Sheets

(56) References Cited

OTHER PUBLICATIONS

Daniel C. Cliburn, "Teaching Shader Programming Through Team-Based Learning in A Computer Graphics", [Online], pp. 11-17 ,[Retrieved from Internet on Jun. 4, 2021], <https://dl.acm.org/doi/pdf/10.5555/2831432.2831434> (Year: 2015).*
https://docs.unrealengine.com/en-us/Engine/Blueprints, Retrieved Feb. 22, 2019, 8 pgs.
https://scratch.mit.edu/, Retrieved Feb. 22, 2019, 2 pgs.

* cited by examiner

METHOD AND SYSTEM FOR CODE TILE PROGRAMMING

FIELD OF THE INVENTION

The present invention relates to computer programming, and more specifically, to visual computer programming.

BACKGROUND OF THE INVENTION

Various attempts have been made to make it easier for non-professional computer programmers to write programs. For example, visual programming languages have been developed to make it easier for novices or non-professional programmers to learn programming in a visually intuitive manner, but it is difficult to scale conventional visual programming languages to satisfy the need for professional code development.

Some of the conventional visual programming languages may be geared toward workstation environments, for example, workstations with conventional keyboard, mouse and display configurations. These visual programming languages may not be sufficiently intuitive for fast and easy learning by novices or non-professional programmers. On the other hand, conventional visually intuitive programming languages that exist outside of workstation environments are generally nothing more than mere toys because they lack a sufficiently rigorous coding structure that corresponds unambiguously to a professional-grade text programming language. Attempts to approximate a professional text-based programming language by a conventional visual programming language have failed due to the lack of a physical metaphor for clarifying the code structure.

These and other drawbacks may be present in conventional visual programming systems and methods.

SUMMARY

Accordingly, at least one aspect of an embodiment of the present disclosure is to address one or more of the drawbacks set forth above. According to at least one embodiment of the disclosure, methods and systems are provided for code tile programming that represents a code structure in a visually intuitive manner while corresponding unambiguously to a professional-grade text-based programming language.

According to one embodiment, a method comprises the steps of: presenting, via a display, a plurality of code tile fragments; receiving, via a user interface, a first input that maneuvers a first one of the tile fragments onto a first layer of code tiles, the first one of the tile fragments representing a first portion of an expression or statement; receiving, via the user interface, a second input that maneuvers a second one of the tile fragments onto a second layer of code tiles, the second one of the tile fragments representing a second portion of the expression or statement, wherein the second layer of code tiles is superimposed on the first layer of code tiles; generating, via a processor, the expression or statement based at least in part on the first and second tile fragments; and presenting, via the display, the expression or statement as stacked first and second layers of code tiles.

According to another embodiment, a system comprises: a display configured to provide a plurality of code tile fragments; a user interface configured to: receive a first input that maneuvers a first one of the tile fragments onto a first layer of code tiles, the first one of the tile fragments representing a first portion of an expression or statement; and receive a second input that maneuvers a second one of the tile fragments onto a second layer of code tiles, the second one of the tile fragments representing a second portion of an expression or statement, wherein the second layer of code tiles is superimposed on the first layer of code tiles; and a processor, coupled to the display and the user interface, configured to generate the expression or statement based at least in part on the first and second tile fragments, and wherein the display is further configured to present the expression or statement as stacked first and second layers of code tiles.

According to yet another embodiment, a method comprises the steps of: presenting, via a display, a plurality of code tile fragments; receiving, via a user interface, a plurality of inputs that maneuver the code tile fragments onto a plurality of stacked layers of code tiles, each of the code tile fragments representing a portion of an expression or statement; generating, via a processor, the expression or statement based at least in part on the code tile fragments; and presenting, via the display, the expression or statement as the stacked layers of code tiles.

These and other disclosures and advantages will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the disclosures, reference is now made to the appended drawings. These drawings should not be construed as limiting the present invention, but are intended to be exemplary only.

DETAILED DESCRIPTION OF EXEMPLARY EMBODIMENT(S)

Figure 1:
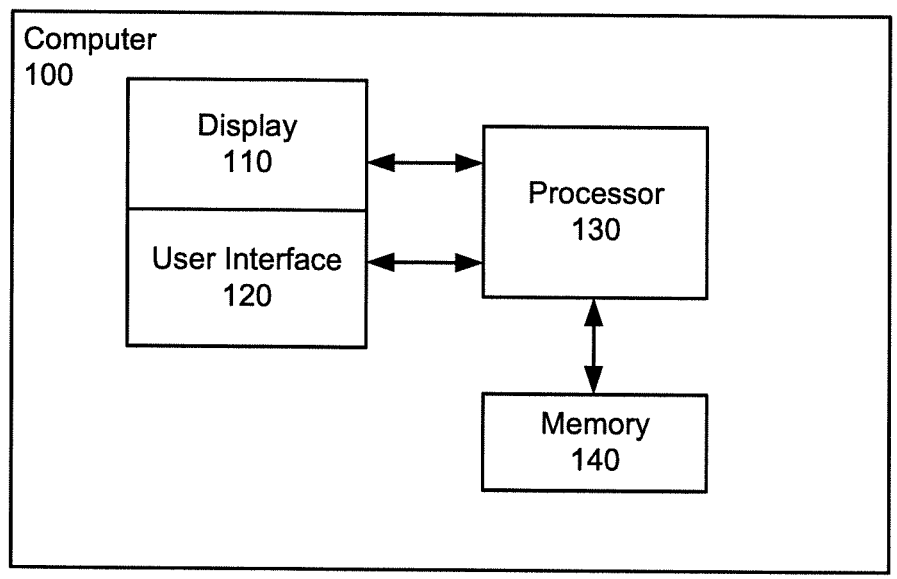
FIG. 1 is a diagram of an example of a system for implementing coded tile programming according to an embodiment of the disclosure.

FIG. 1 is a diagram illustrating an example of a system for providing code tile programming according to an embodiment of the disclosure. In an embodiment, a computer 100 for providing code tile programming may include a display 110, a user interface 120, a processor 130, and a memory 140. The computer 100 may be a workstation, a personal computer, a tablet, a mobile device, or the like. The user interface 120 may be a mouse, a keyboard, a keypad, a touchpad, a game controller, a touchscreen, or the like, or a combination thereof. In an embodiment in which the user interface 120 includes a touchscreen, the user interface 120 may be an integral part of the display 110. In an embodiment, the processor 130 may be coupled to the display 110 and the user interface 120, and the memory 140 may be coupled to the processor 130. The computer 100 for providing code tile programming may be implemented in various configurations as understood by persons skilled in the art.

Figure 2:
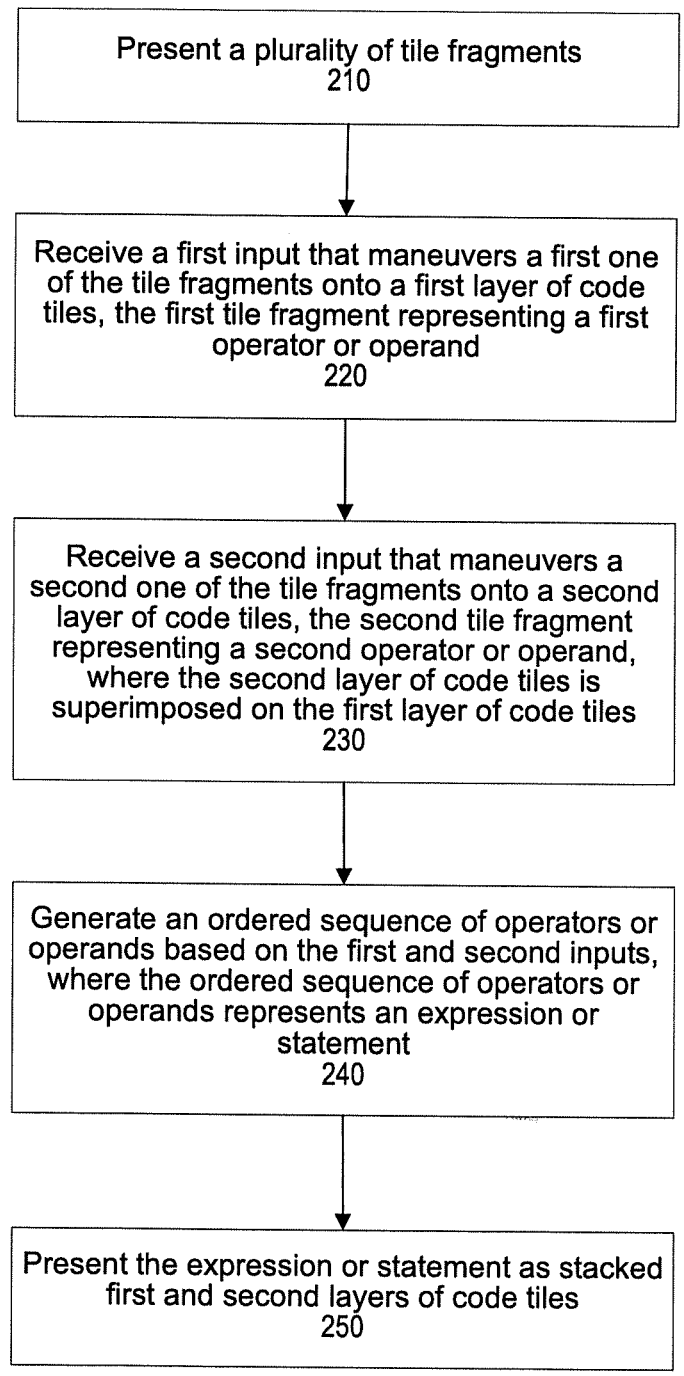
FIG. 2 is a flowchart illustrating an example of a process for providing coded tile programming according to an embodiment of the disclosure.

FIG. 2 is a flowchart illustrating an example of a process 200 for providing coded tile programming according to an embodiment of the disclosure. At step 210, the computer presents a plurality of tile fragments via the display. At step 220, the computer receives, via the user interface, a first input that maneuvers a first one of the tile fragments onto a first layer of code tiles, the first tile fragment representing a first operator or operand. In an embodiment, the user interface that receives the first input may be a mouse that can be maneuvered by the programmer. In an embodiment, the programmer, by depressing a button on the mouse and moving the mouse, may move a tile fragment to a desired location on the first layer of code tiles on the display. In another embodiment, the user interface that receives the first input may be a touchscreen which allows the programmer to maneuver a tile fragment to a desired location on the first layer of code tiles on the touchscreen. In some other embodiments, the interface may be a keyboard, a keypad, a touchpad, a game controller, or a combination thereof, that allows the programmer to select and maneuver a tile fragment to a desired location on the first layer of code tiles presented on the display. In an embodiment, the programmer may select and maneuver a new tile fragment to a desired location. In another embodiment, the programmer may maneuver an existing tile fragment by relocating the tile fragment from one location to another.

In an embodiment, the tile fragment selected by the programmer to be placed onto the first layer of code tiles may represent an operator or operand, such as a mathematical, logical or relational operator or operand. Operands are objects to be manipulated by operators and operators are symbols that represent specific operations or actions, as understood by persons skilled in the art. A mathematical operator may be an arithmetic operator such as addition (+), subtraction (−), multiplication (x) or division (÷), a logarithmic operator such as ln( ) or $\log_{10}$( ), or a trigonometric operator such as sin( ), cos( ), tan( ), cot( ), csc( ) or sec( ) for example. A logical operator may be a Boolean operator such as AND, OR, NOT, NAND, NOR or XOR, for example. A relational operator may be an equality (=) or inequality, such as greater than (>), greater than or equal to (≥), less than (<), less than or equal to (≤), or not equal to (< >), as used in conditional statements such as if-then or while-do. Some examples of operators are described in further detail below with respect to FIG. 4.

In an embodiment, code tiles may be a representation of an abstract syntax tree (AST), and thus capable of capturing any binary operator. In this embodiment, the code tiles may include infix operators and infix function calls. For example, in Haskell programming language one may write A 'myFunction' B, which is equivalent to myFunction (A, B). Moreover, in an embodiment, macros may allow code tiles to express operators such as the C++ ternary operator, for example, as described in http://www.cplusplus.com/articles/1AUq5Di1/. In an embodiment, this may extend to an arbitrary syntax of a modern programming language. In some embodiments, the programmer may select one or more additional tile fragments that represent one or more additional operators or operands and maneuver them to different locations on the first layer of code tiles.

Referring to FIG. 2, at step 230, the computer receives, via the user interface, a second input that maneuvers a second one of the tile fragments onto a second layer of code tiles, the second tile fragment representing a second operator or operand, where the second layer of code tiles is superimposed on the first layer of code tiles. The presentation of multiple stacked layers of code tiles on the display will be described in further detail below with respect to FIGS. 4-6. As described above with regard to the first input, the user interface that receives the second input may be a mouse, a touchscreen, a keyboard, a keypad, a touchpad, a game controller, or a combination thereof, that allows the programmer to select and maneuver a tile fragment to a desired location on the second layer of code tiles presented on the display. In an embodiment, the programmer may select and maneuver a new tile fragment to a desired location on the first layer, second layer, or any other layer of code tiles to create or modify an expression or statement. In another embodiment, the programmer may maneuver an existing tile fragment by relocating the tile fragment from one location to another, on the same layer or different layers, to create or modify an expression or statement. In an embodiment, the programmer may create bounded or unbounded expressions or statements by maneuvering tile fragments onto one or more layers of code tiles. In an embodiment, one or more intermediate expressions or statements may be included in a larger expression or statement, examples of which are shown in FIG. 6 and described below.

In an embodiment, the tile fragment selected by the programmer to be placed onto the second layer of code tiles may represent an operand, that is, an object, such as a variable or a constant, that is to be manipulated by one or more operators. In an embodiment, the programmer may select one or more additional tile fragments that represent one or more additional operands and maneuver them to different locations on the second layer of code tiles. In another embodiment, the programmer may select one or more tile fragments that represent one or more operators and maneuver them to one or more specific locations on the second layer of code tiles. In yet another embodiment, the programmer may select tile fragments that include both operands and operators and place them to specific locations on the second layer of code tiles. In some embodiments, it may be desirable to place tile fragments representing operators onto the first layer of code tiles and tile fragments representing operands onto the second layer of code tiles for visually intuitive programming, examples of which will be described in further detail below with respect to FIG. 4.

Referring to FIG. 2, at step 240, after the computer receives, via the user interface, the first input that maneuvers the first tile fragment onto the first layer of code tiles and the second input that maneuvers the second tile fragment onto the second layer of code tiles, the processor generates an ordered sequence of operators or operands based on the first and second inputs, where the ordered sequence of operators or operands represents an expression or statement. At step 250, the computer may present, via the display, the expression or statement as stacked first and second layers of code tiles.

In some embodiments, one or more additional layers of code tiles may be provided, and the programmer may be allowed to select and maneuver one or more additional tile fragments onto one or more additional layers of code tiles. Such an additional tile fragment may be a newly created tile fragment or an existing tile fragment that may be selected and moved or dragged by the user and placed onto one of the layers as part of the process to create a new expression or statement. In an embodiment, the computer may further receive, via the user interface, an additional input that maneuvers an additional tile fragment onto a third layer of code tiles, where the third layer of code tiles is superimposed on the second layer of code tiles. In an embodiment, the processor may generate an ordered sequence of operators or operands based on the inputs that maneuver the tile fragments onto the first, second and third layers of code tiles, where the ordered sequence of operators or operands represents an expression or statement. In an embodiment, the computer may present, via the display, the expression or statement as stacked first, second and third layers of code tiles. One or more additional layers of code tiles may be provided for the programmer to create more complex expressions or statements.

Figure 3:
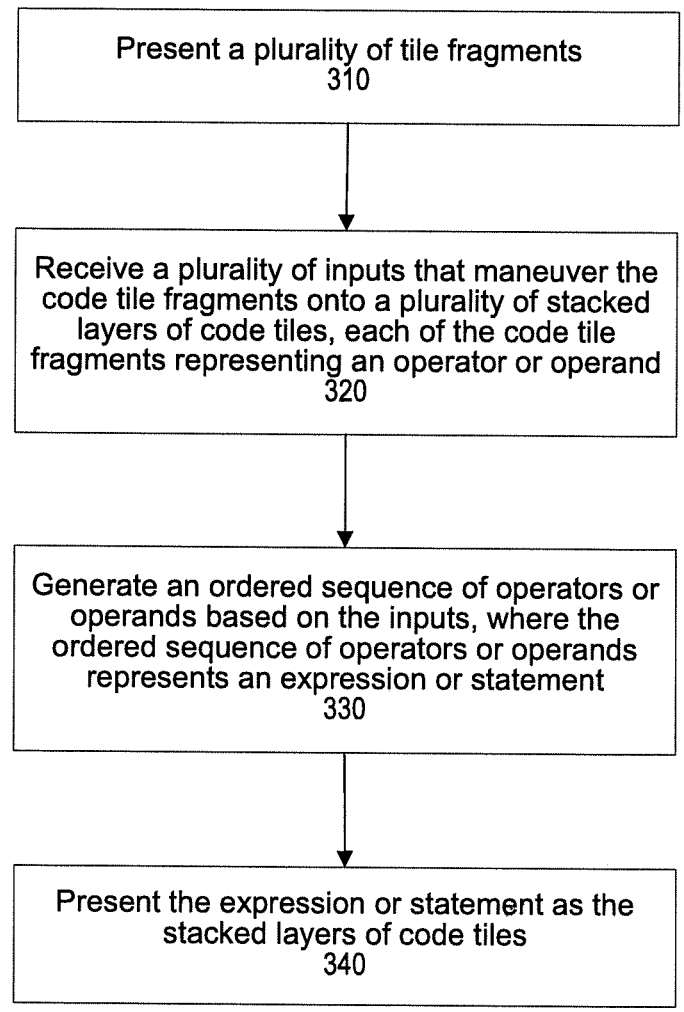
FIG. 3 is a flowchart illustrating another example of a process for providing coded tile programming according to an embodiment of the disclosure.

FIG. 3 is a flowchart illustrating another example of a process 300 for providing coded tile programming according to an embodiment of the disclosure. At step 310, the computer presents a plurality of tile fragments via the display. At step 320, the computer receives, via the user interface, a plurality of inputs that maneuver the code tile fragments onto a plurality of stacked layers of code tiles, each of the code tile fragments representing an operator or operand. As described above with respect to FIG. 2, in some embodiments, the user interface that receives the inputs from the programmer may be a mouse, a touchscreen, a keyboard, a keypad, a touchpad, a game controller, or a combination thereof, that allows the programmer to select and maneuver the tile fragments to specific locations on the layers of code tiles presented on the display.

Referring to FIG. 3, at step 330, after the computer receives, via the user interface, inputs that maneuver the tile fragments onto the stacked layers of code tiles, the processor generates an ordered sequence of operators or operands based on the inputs, where the ordered sequence of operators or operands represents an expression or statement. At step 340, the computer may present, via the display, the expression or statement as stacked layers of code tiles.

In an embodiment, such an expression or statement, presented as stacked layers of code tiles, may correspond unambiguously to an expression or statement in a professional-grade text-based programming language while being visually intuitive to the programmer or viewer. In an embodiment, the programmer may modify the expression or statement by maneuvering one or more additional tile fragments onto one or more layers of code tiles or removing one or more existing tile fragments from one or more layers of code tiles in a visually intuitive manner. In an embodiment, the visual programming language may be able to validate whether maneuvers of tile fragments are allowed by the rules of the programming language. In an embodiment, the programming language may provide feedback to the programmer as to whether a certain tile maneuver is allowed.

Figure 4:
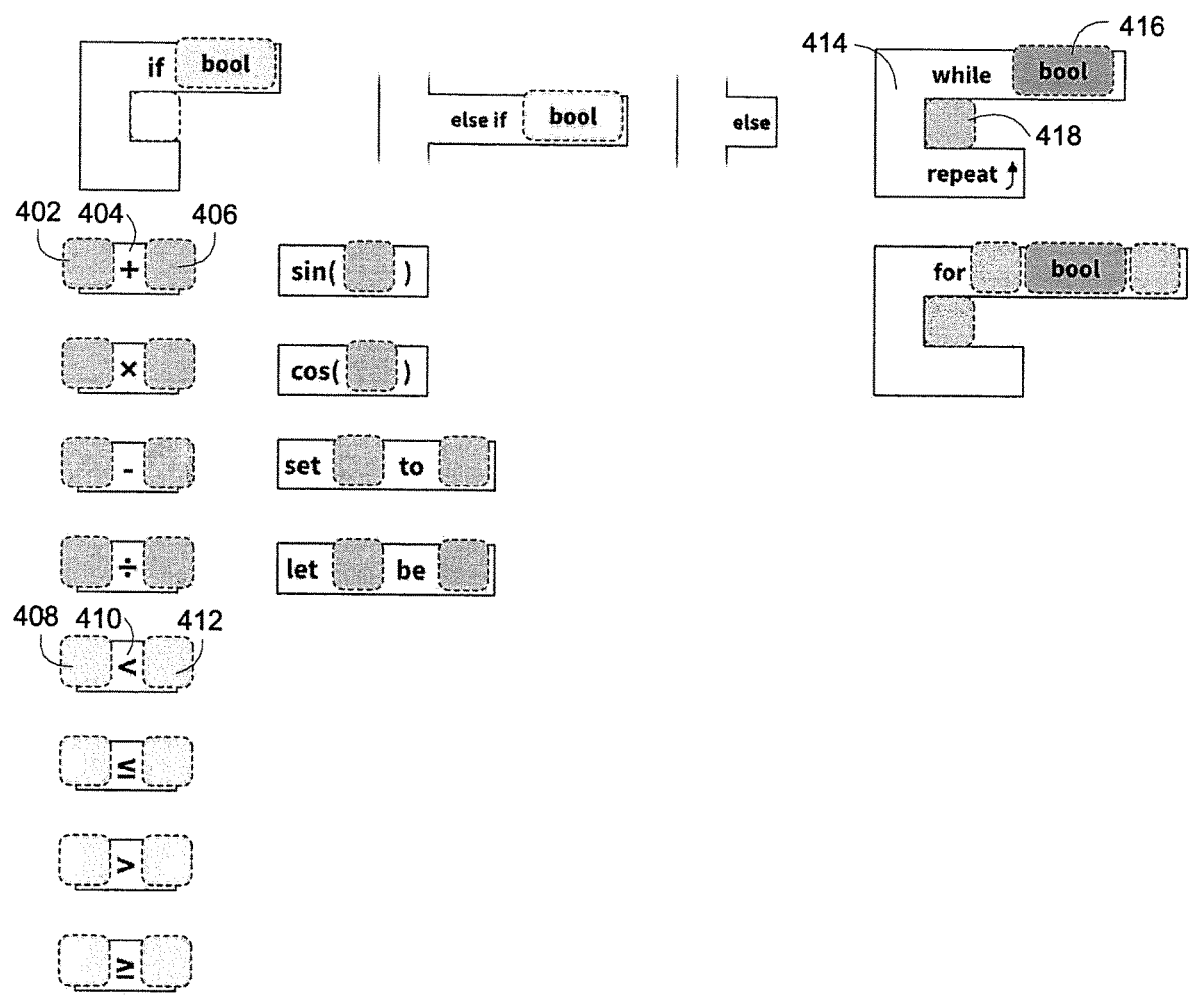
FIG. 4 is a diagram illustrating an example of a screen display for coded tile programming with stacked layers of operators and operands according to an embodiment of the disclosure.

FIG. 4 is a diagram illustrating an example of a screen display for coded tile programming with stacked layers of operators and operands according to an embodiment of the disclosure. FIG. 4 illustrates examples of arithmetic, trigonometric, and relational expressions as well as examples of conditional statements. For example, an expression of a simple add (+) operation is illustrated by tile fragments 402, 404 and 406 in FIG. 4. In this example, the tile fragment 404 on the first (lower) layer of code tiles represents an add (+) operator, the tile fragment 402 on the second (upper) layer of code tiles represents a first operand for the add operation, and the tile fragment 406 on the second layer of code tiles represents a second operand for the add operation. In an embodiment, the expression represented by the tile fragments 402, 404 and 406 may be presented on a two-dimensional display such that the second layer of code tiles, which includes tile fragments 402 and 406 for the two operands, is superimposed on but slightly offset from the first layer of code tiles, which includes tile fragment 404 for the add (+) operator, to allow the programmer or viewer to view the stacked layers of code tiles as if they are presented in three dimensions. In an embodiment, tile fragments on different layers of code tiles may be presented on the display by different colors to make them easily distinguishable to programmers or viewers.

FIG. 4 also includes exemplary illustrations of two layers of code tiles for the subtract, multiply and divide operations. Similar to the add operation described above, the subtract, multiply and divide operators are included in tile fragments on the lower layer of code tiles, whereas the operands for the subtract, multiply and divide operations are included in tile fragments on the upper layer of code tiles. Examples of code tiles for trigonometric operations, such as sine and cosine, are also shown in FIG. 4. In an embodiment, the operator for the sine function, sin( ) is provided on a tile fragment on the lower layer of code tiles, whereas the operand, i.e., the argument for the sine function, is provided on a tile fragment on the upper layer of code tiles. Likewise, the operator for the cosine function, cos( ) is provided on a tile fragment on the lower layer of code tiles, whereas the operand, i.e., the argument for the cosine function, is provided on a tile fragment on the upper layer of code tiles.

FIG. 4 also includes examples of code tiles for relational expressions such as less than (<), less than or equal to (≤), greater than (>), and greater than or equal to (≥). For example, the code tiles for the less-than expression may include a less-than (<) operator in a tile fragment 410 on the lower layer of code tiles and two operands in tile fragments 408 and 412 on the upper layer of code tiles. In an embodiment, the tile fragments on the upper layer of code tiles may be superimposed on but slightly offset from the first layer of code tiles, to allow the programmer or viewer to view the stacked layers of code tiles as if they are presented in three dimensions on a two-dimensional display. In an embodiment, tile fragments on different layers of code tiles may be presented on the display by different colors to make them easily distinguishable to programmers or viewers.

FIG. 4 also includes exemplary illustrations of conditional statements presented in layers of code tiles, for example, an "if" statement, an "else if" statement, a "while . . . repeat" statement, and a "for" statement. In an embodiment, the "while . . . repeat" statement may be presented as three layers of code tiles as shown in FIG. 4. In an embodiment, the conditional expression following "while" may be provided in a tile fragment 416 on a code tile layer above the layer for the "while . . . repeat" loop. In an embodiment, the action(s) to be performed if the conditional expression in tile fragment 416 is true may be provided in one or more code tile fragments, such as tile fragment 418, within the "while . . . repeat" loop represented by tile fragment 414. In an embodiment, the tile fragment 418 for the action(s) to be performed if the conditional expression in tile fragment 416 is true may be placed on a code tile layer that is one level below the layer for the "while . . . repeat" tile fragment 414 to present the "while . . . repeat" loop in a visually intuitive manner. In an embodiment, tile fragments on the three different layers of code tiles may be presented on the display by three different colors to make them easily distinguishable to programmers or viewers. In an alternate embodiment, tile fragment 418 for the action(s) to be performed within the "while . . . repeat" loop may be provided on a layer at the same level as the layer for the "while . . . repeat" tile fragment 414, but presented by a color distinct from the color of the "while . . . repeat" tile fragment 414.

Figure 5:
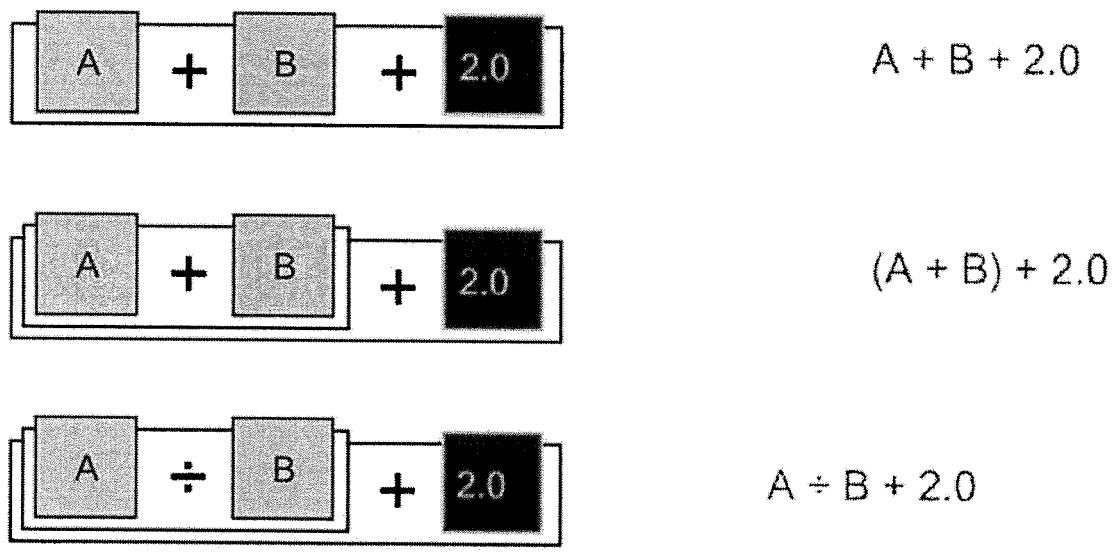
FIG. 5 is a diagram illustrating another example of a screen display for coded tile programming with stacked layers of operators and operands for arithmetic operations according to an embodiment of the disclosure.
Figure 6:
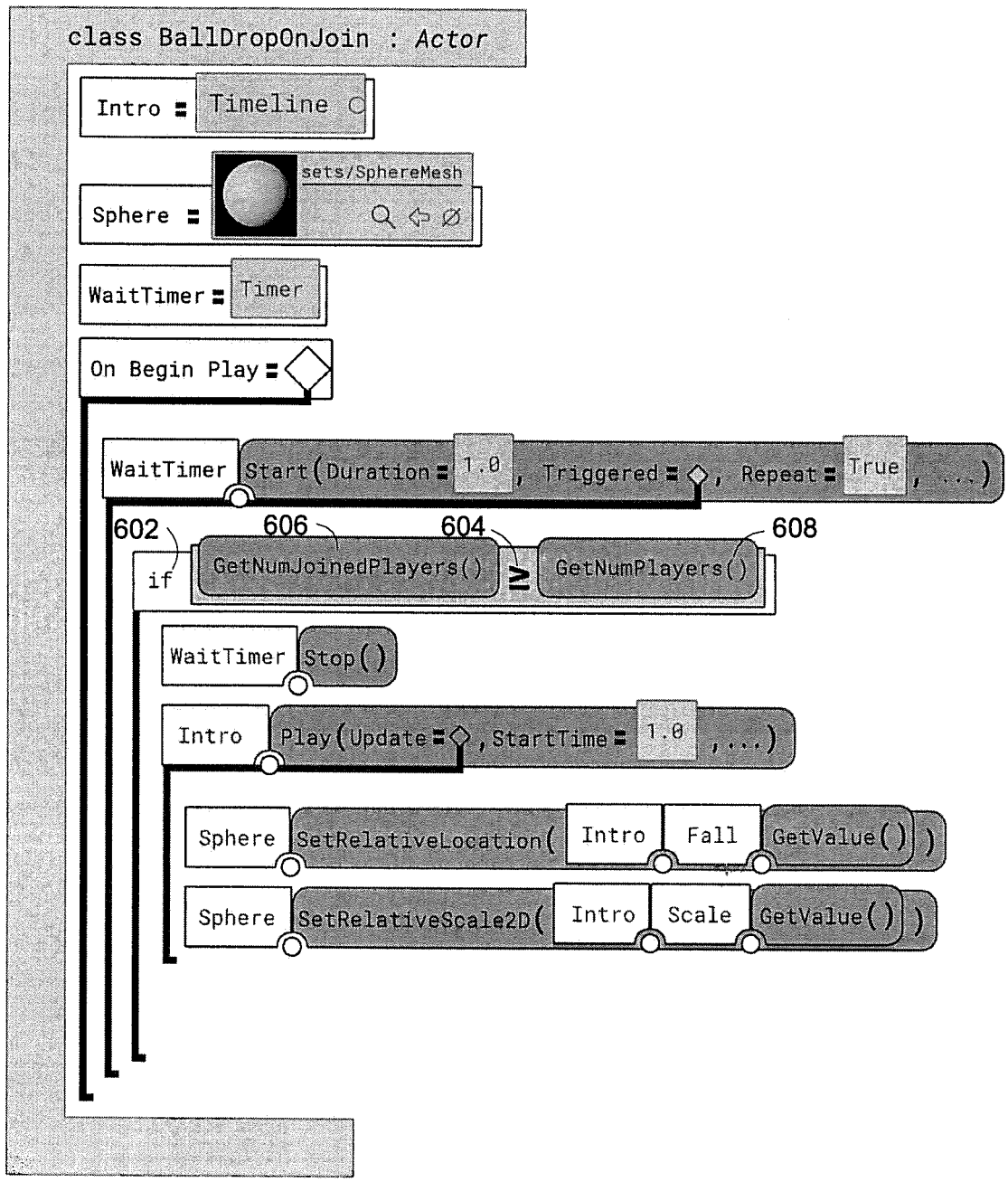
FIG. 6 is a diagram illustrating another example of a screen display for coded tile programming with stacked layers of statements according to an embodiment of the disclosure.

FIG. 5 is a diagram illustrating another example of a screen display for coded tile programming with stacked layers of operators and operands for arithmetic operations according to an embodiment of the disclosure. The first expression illustrated in FIG. 5, A+B+2.0, is presented on two layers of code tiles. In this example, the two add (+) operators are provided on the first layer of code tiles, whereas the operands A, B and 2.0 are provided on the second layer of code tiles, where A and B are variables and 2.0 is a constant.

In contrast, the second expression illustrated in FIG. 5, (A+B)+2.0, is presented on three layers of code tiles. In this example, the first two operands, A and B, which are variables, are provided as tile fragments on the uppermost layer of code tiles. The first add (+) operator for adding A and B is provided on an intermediate layer of code tiles below the layer of code tiles for A and B. The second add (+) operator is provided on the lowermost layer of code tiles, below the intermediate layer for the first add (+) operator. The third operand, 2.0, which is a constant, is represented by a tile fragment on the intermediate layer, the same layer on which the tile fragment for the first add (+) operator between A and B is located. In this configuration, A and B must be added before 2.0 is added to (A+B). Although the result of the expression (A+B)+2.0 is not different from the expression A+B+2.0 from a mathematical standpoint, in computer programming it may be desirable or necessary in some situations to enforce a certain order of operations.

The third expression illustrated in FIG. 5, A+B+2.0, is presented on three layers of code tiles. In this example, the first two operands, A and B, which are variables, are provided as tile fragments on the uppermost layer of code tiles. The divide (+) operator for dividing A by B is provided on an intermediate layer of code tiles below the layer of code tiles for A and B. The add (+) operator is provided on the lowermost layer of code tiles, below the intermediate layer for the divide (+) operator. The third operand, 2.0, which is a constant, is represented by a tile fragment on the intermediate layer, the same layer on which the tile fragment for the divide (+) operator between A and B is located. In this configuration, A must be divided by B before 2.0 is added to (A=B).

FIG. 6 is a diagram illustrating another example of a screen display for coded tile programming with stacked layers of statements according to an embodiment of the disclosure. In FIG. 6, a portion of a class in an exemplary object-oriented program code includes multiple tile fragments arranged in multiple layers of code tiles. For example, the conditional statement "if GetNumJoinedPlayers( )≥GetNumPlayers( )" is presented in three layers of code tiles. In an embodiment, the conditional operator "if" is provided in tile fragment 602 on the lowermost layer of code tiles, the relational operator "≥" is provided in tile fragment 604 on the intermediate layer of code tiles, and the two operands "GetNumJoinedPlayers( )" and "GetNumPlayers( )" are provided in tile fragments 606 and 608, respectively, on the uppermost layer of code tiles. In an embodiment, the tile fragments 606 and 608 on the uppermost layer of code tiles may be superimposed on but slightly offset from the tile fragment 604 on the intermediate layer of code tiles. Likewise, the tile fragment 604 on the intermediate layer of code tiles may be superimposed on but slightly offset from the tile fragment 602 on the lowermost layer of code tiles to allow the programmer or viewer to view the stacked layers of code tiles as if they are presented in three dimensions on a two-dimensional display. In an embodiment, the tile fragments on different layers of code tiles may be presented on the display by different colors to make them easily distinguishable to programmers or viewers.

In some embodiments, a programmer may copy or otherwise apply the text of an existing program to a code tile or tile fragment. In other words, the code tiles or tile fragments may be capable of ingesting the text of an existing program. During code development, the programmer may be able to alter the program by adding, deleting, changing or rearranging the code tile fragments via the user interface. In some embodiments, the programmer may save the modified program, which is presented on the display as code tiles, into a storage as the text of a conventional text-based programming language.

Potential users of code tile programming according to various embodiments of the disclosure may include novice programmers, students, technical designers, technical artists, gameplay programmers, software professionals, or the like. Advanced professional software programmers may also use code tile programming according to various embodiments of the disclosure as an alternative to or in conjunction with a conventional text-based editor. Because code tile programming according to various embodiments of the disclosure allows programs developed with code tiles to be transformed unambiguously into corresponding text code in a conventional text-based programming language and vice versa, experienced professional programmers may be able to collaborate with their less experienced colleagues because the program code would be readable as a conventional text-based program as well as a visually intuitive code tile structure according to embodiments of the disclosure.

According to an embodiment, the systems and processes described herein may be implemented on any general or special purpose computational device, either as a standalone application or applications, or even across several general or special purpose computational devices connected over a network and as a group operating in a client-server mode. According to another embodiment, a computer-usable and writeable medium having a plurality of computer readable program code stored therein may be provided for practicing the processes disclosed herein. For example, the computer-usable and writeable medium may be comprised of a CD ROM, a floppy disk, a hard disk, or any other computer-usable medium. One or more of the components of the system or systems may comprise computer readable program code in the form of functional instructions stored in the computer-usable medium such that when the computer-usable medium is installed on the system or systems, those components cause the system to perform the functions described. The computer readable program code may also be bundled with other computer readable program software. Also, only some of the components may be provided in computer-readable code.

Additionally, various entities and combinations of entities may employ a computer to implement the components performing the above-described functions. According to an embodiment, the computer may be a standard computer comprising an input device, an output device, a processor device, and a data storage device. According to other embodiments, various components may be computers in different departments within the same corporation or entity. Other computer configurations, including a distributed client server configuration, may also be used. According to another embodiment, various components may be separate entities such as corporations or limited liability companies. Other embodiments, in compliance with applicable laws and regulations, may also be used.

In some embodiments, the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages will be apparent to those skilled in the art from consideration of the specification and practice of the subject matter disclosed herein. The specification and examples should be considered exemplary only. The intended scope of the invention is only limited by the claims appended hereto.

The invention claimed is:

1. A method comprising the steps of:
   presenting, via a display, a plurality of code tile fragments;
   receiving, via a user interface, a first input that maneuvers a first one of the tile fragments onto a first layer of code tiles, the first one of the tile fragments representing a first portion of an expression or statement;
   receiving, via the user interface, a second input that maneuvers a second one of the tile fragments onto a second layer of code tiles, the second one of the tile fragments representing a second portion of the expression or statement, wherein the second layer of code tiles is superimposed on the first layer of code tiles;
   receiving, via the user interface, a third input that maneuvers a third one of the tile fragments onto a third layer of code tiles, the third one of the tile fragments representing a third portion of the expression or statement, wherein the third layer of code tiles is superimposed on the second layer of code tiles;
   generating, via a processor, the expression or statement based at least in part on the first, second and third tile fragments, wherein the expression or statement includes an ordered sequence of at least one operator and at least one operand in an object-oriented program code to be executed by the processor, wherein the processor applies said at least one operator to said at least one operand upon execution of the expression or statement in the object-oriented program code; and
   presenting, via the display, the expression or statement as stacked first, second and third layers of code tiles.

2. The method of claim 1, further comprising the step of:
   receiving, via the user interface, a fourth input that maneuvers a fourth one of the tile fragments onto the first layer of code tiles, the fourth one of the tile fragments representing a fourth portion of the expression or statement;
   generating, via the processor, the expression or statement based at least in part on the first, second, third and fourth tile fragments; and
   presenting, via the display, the expression or statement as stacked first, second and third layers of code tiles.

3. The method of claim 1, further comprising the step of:
   receiving, via the user interface, a fourth input that maneuvers a fourth one of the tile fragments onto the second layer of code tiles, the fourth one of the tile fragments representing a fourth portion of the expression or statement;
   generating, via the processor, the expression or statement based at least in part on the first, second, third and fourth tile fragments; and
   presenting, via the display, the expression or statement as stacked first, second and third layers of code tiles.

4. The method of claim 1, wherein the first layer of code tiles includes one or more operators.

5. The method of claim 4, wherein the second layer of code tiles includes one or more operands.

6. The method of claim 1, wherein the user interface comprises a device selected from the group consisting of a mouse, a keyboard, a keypad, a touchpad, a game controller, and a touchscreen.

7. The method of claim 1, wherein the tile fragments are presented by at least two different colors.

8. A system comprising:
   a display configured to provide a plurality of code tile fragments;
   a user interface configured to:
      receive a first input that maneuvers a first one of the tile fragments onto a first layer of code tiles, the first one of the tile fragments representing a first portion of an expression or statement; and
      receive a second input that maneuvers a second one of the tile fragments onto a second layer of code tiles, the second one of the tile fragments representing a second portion of an expression or statement, wherein the second layer of code tiles is superimposed on the first layer of code tiles; and
      receive a third input that maneuvers a third one of the tile fragments onto a third layer of code tiles, the third one of the tile fragments representing a third portion of the expression or statement, wherein the third layer of code tiles is superimposed on the second layer of code tiles;
   a processor, coupled to the display and the user interface, configured to generate the expression or statement based at least in part on the first, second and third tile fragments, wherein the expression or statement includes an ordered sequence of at least one operator and at least one operand in an object-oriented program code to be executed by the processor, wherein the processor applies said at least one operator to said at least one operand upon execution of the expression or statement in the object-oriented program code, and
   wherein the display is further configured to present the expression or statement as stacked first, second and third layers of code tiles.

9. The system of claim 8, wherein:
   the user interface is further configured to receive a fourth input that maneuvers a fourth one of the tile fragments onto the first layer of code tiles, the fourth one of the tile fragments representing a fourth portion of the expression or statement;
   the processor is further configured to generate the expression or statement based at least in part on the first, second, third and fourth tile fragments; and
   the display is further configured to present the expression or statement as stacked first, second and third layers of code tiles.

10. The system of claim 8, wherein:
   the user interface is further configured to receive a fourth input that maneuvers a fourth one of the tile fragments onto the second layer of code tiles, the fourth one of the tile fragments representing a fourth portion of the expression or statement;

the processor is further configured to generate the expression or statement based at least in part on the first, second, third and fourth tile fragments; and the display is further configured to present the expression or statement as stacked first, second and third layers of code tiles.

11. The system of claim 8, wherein the first layer of code tiles includes one or more operators.

12. The system of claim 11, wherein the second layer of code tiles includes one or more operands.

13. The system of claim 8, wherein the user interface comprises a device selected from the group consisting of a mouse, a keyboard, a keypad, a touchpad, a game controller, and a touchscreen.

14. The system of claim 8, wherein the tile fragments are presented by at least two different colors.

* * * * *